UNITED STATES PATENT OFFICE.

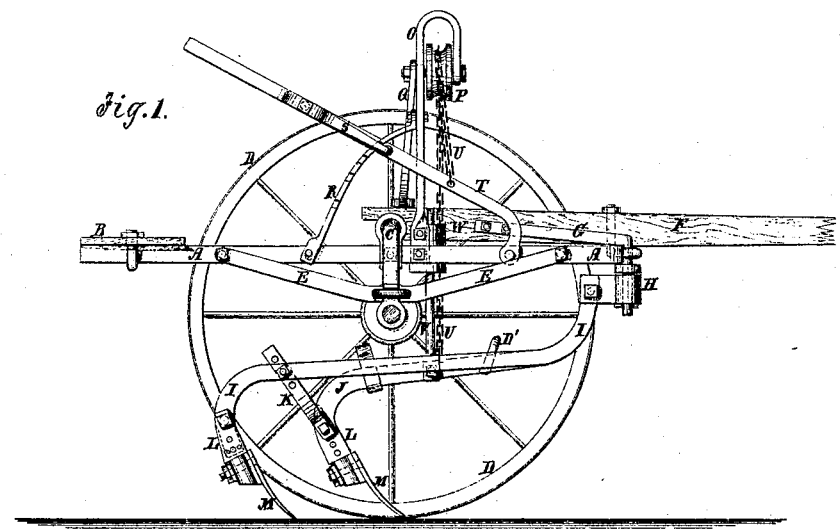
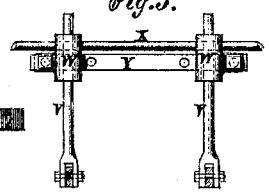
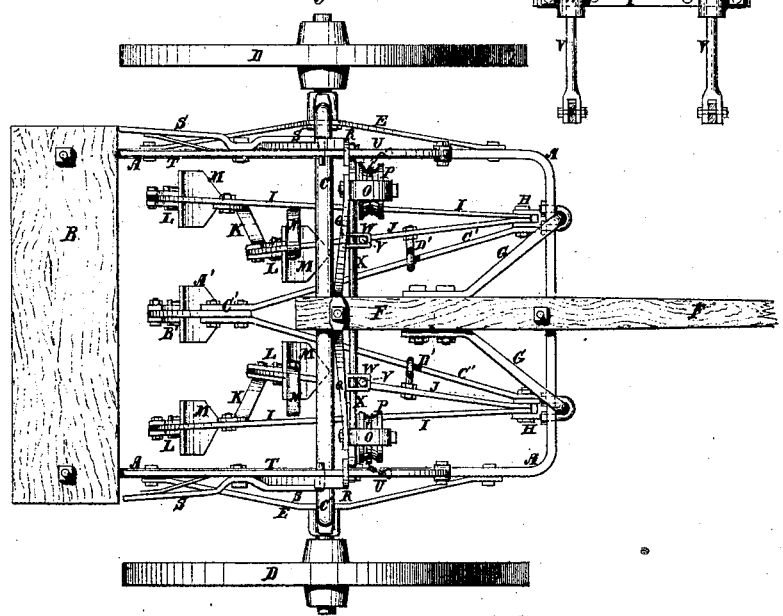

ISAAC B. MAHON, OF DUNKIRK, OHIO.

IMPROVEMENT IN CULTIVATORS.

Specification forming part of Letters Patent No. 110,256, dated December 20, 1870.

*To all whom it may concern:*

Be it known that I, ISAAC B. MAHON, of Dunkirk, in the county of Hardin and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification.

Figure 1 is a side view of my improved cultivator, one of the sulky-wheels being removed. Fig. 2 is a top view of the same. Fig. 3 is a detail view of the device for adjusting the distance apart of the plow-beams.

Similar letters of reference indicate corresponding parts.

My invention relates to cultivators; and it consists in an improved arrangement of mechanism for removing and lifting the fifth plow.

A is the frame of the machine, which is made of a single flat bar of wrought-iron bent twice, as shown in Fig. 2, to form the front and sides of the frame. The rear ends of the bar A are connected by the seat-board B, which forms the driver's seat, and which is adjustably attached to said bar by hook-bolts and nuts, so that it may be moved forward and back to adjust the position of the driver's weight, as required.

C is the axle, which is also made of a single bar of wrought-iron, and may be flat, square, or round, as may be desired. The frame A is hung from the axle C by clips or plates, through the upper parts of which the said axle passes, and the lower parts of which are bolted to the middle parts of the side of the bar or frame A. The end parts of the axle C are bent twice at right angles, and upon its ends are formed the journals or spindles for the wheels D. The connection between the frame A and the axle C is strenghtened by the curved brace-bars E, the ends of which are bolted to the front and rear parts of the sides of the bar or frame A, and the middle parts of which are connected to the vertical parts of the axle C by clips or clamps, which are kept from moving up and down upon the said parts of the axle by passing around projections upon the upper side of ring-collars passed over the spindles of said axle.

F is the tongue, which is securely attached to the axle C and front part of the frame A. The forward part of the frame A is supported by the braces G, the rear ends of which are securely bolted to the opposite sides of the rear part of the tongue F, and the forward parts of which are secured to the forward part of the frame A by clips. The forward ends of the brace-bars G are turned downward, and are rounded off, to serve as spindles for the socket of the clamps H to work upon, to allow the plows to have a free lateral movement.

I J are the plow-beams, two pairs of which are used, one upon each side of the machine. The forward ends of each pair of beams I J are brought together, and are pivoted to the clamps H by a bolt, so that the plows may have a free vertical movement, each independent of the other. The rear parts of each pair of beams I J are adjustably and rigidly connected, so that they may move together by the curved or bent connecting-bar K, the lower end of which is securely bolted to the rear or lower part of the inner beam, J, and the upper end of which is bolted to the rear horizontal part of the outer beam, I, several holes being formed through the upper end of the said bar K for the said bolt, so that the two beams may be adjusted to work at the same level or at different levels, as may be desired.

L are the seats, to which the plows M are attached. The upper parts of the seats L are slotted, to fit upon the downwardly-projecting rear ends of the beams I J, which serve as standards. The upper parts of the seats L are secured and pivoted to the beams I J by a bolt. The seats L are held in position upon the lower ends of the beams I J by wooden pins passing through holes in the said seats and standards or beams, several holes being formed through each of said parts for the reception of the said wooden pin, so that the pitch of the plows may be adjusted at will. By this construction, should the plow strike an obstruction the wooden pin will be broken, allowing the plow to turn back, and thus guarding the plow from being broken.

N are foot-rests, which are adjustably clamped to the beams I, so that they may be adjusted as the driver's convenience may require.

O are upright standards, the lower ends of which are securely bolted to the frame A, just in front of the axle C, and to the upper part of which is pivoted a pulley, P, the upper end of the standard being bent over, so that both journals of said pulley may be supported.

Q are the braces, the upper ends of which are bolted to the upper parts of the standards O, and the lower parts of which are bolted to the rear part of the tongue F. The standards O are further secured by the curved brace-bars R, the upper ends of which are bolted to the upper part of the said standards O, and the lower ends of which are bolted to the frame A in the rear of the axle C. The outer edges of the curved brace-bars R are notched, to receive the spring-lever catches S, pivoted to the sides of the levers T in such positions as to catch upon the said notched brace-bars R, and the outer ends of which extend back into such a position as to be conveniently reached and operated by the driver. The rear ends of the levers T extend back into such a position that they may be conveniently reached and operated by the driver, and their forward ends are pivoted to the forward parts of the sides of the frame A.

To the levers T, directly beneath the pulley P, is attached one end of the chain U, which passes over the pulley P, and the other end of which is attached to the beams J, so that by operating the levers T the plows may be raised and lowered as desired, the spring-catches S and notches of the bars R holding them securely in place.

V are spindles, the lower ends of which are secured and pivoted to the plow-beams J by bolts. The upper parts of the spindles V pass up through and work freely in the clips W. The clips W slide upon the cross-rod X, the ends of which are attached to the frame A or standard O. The clips W are adjustably connected together by a bar, Y, to which they are bolted, several holes being made in said bar for the reception of the said bolts, so that the two set of plows may be adjusted farther apart or nearer together, as the circumstances of the case may require.

A′ is a fifth plow, the seat B′ of which is constructed and adjustably connected with the plow-beam C′ in the same manner as the seats of the other plows, as hereinbefore described. The forward part of the plow-beam C′ is made branched or in two parts, bolted to the curved rear part or standard, the said branches passing through the guides D′, bolted to the beams I. The forward ends of the branches of the beams C′ are bolted to the clamps H by the same bolts that secure the beams I J to said clamps, as shown in Fig. 2. The fifth plow is designed to be used when the cultivator passes between the rows of plants, and is detached when the cultivator is required to straddle the row of plants, so as to cultivate both sides of the same row. In the latter case the fifth plow may be replaced by shields, to prevent small plants from being injured by the dirt thrown against them by the plows.

Having thus described my invention, I claim as new and desire to secure by Letters Patent—

The arrangement, in a cultivator, of a bi-branched pivoted beam, C′ C′, and detachable guides D′, as set forth, for the purpose of enabling the fifth plow, A′, to be readily removed or lifted up simultaneously with the other plows.

ISAAC B. MAHON.

Witnesses:
E. F. SHUER,
CHARLES MAHON.